(12) United States Patent
Marsh

(10) Patent No.: US 6,186,456 B1
(45) Date of Patent: Feb. 13, 2001

(54) LOCKING SHELF SUPPORT

(76) Inventor: Thomas R. Marsh, 1732 Highpoint-Wallburg Rd., High Point, NC (US) 27265

( * ) Notice: Under 35 U.S.C. 154(b), the term of this patent shall be extended for 0 days.

(21) Appl. No.: 09/421,706

(22) Filed: Oct. 20, 1999

(51) Int. Cl.⁷ .............................. A47G 29/02; A47F 5/08
(52) U.S. Cl. ......................... 248/243; 248/250; 108/108; 211/90.02
(58) Field of Search .................................. 248/235, 239, 248/243, 250, 240; 108/108, 109, 110; 211/90.01, 90.02, 187, 193

(56) References Cited

U.S. PATENT DOCUMENTS

| | | | |
|---|---|---|---|
| 1,829,009 | * 10/1931 | Madsen | 248/243 |
| 3,471,111 | * 10/1969 | MacDonald | 248/235 |
| 3,471,112 | 10/1969 | MacDonald et al. | 248/239 |
| 4,037,813 | 7/1977 | Loui et al. | 248/250 |
| 4,053,132 | 10/1977 | Del Pozzo | 248/235 |
| 4,432,523 | 2/1984 | Follows | 248/250 |
| 4,666,117 | 5/1987 | Taft | 248/243 |
| 4,732,358 | * 3/1988 | Hughes et al. | 248/243 |
| 4,819,901 | * 4/1989 | McDonald | 248/250 |
| 4,856,746 | * 8/1989 | Wrobel et al. | 248/250 |
| 5,080,311 | * 1/1992 | Engstrom | 248/250 |
| 5,195,708 | * 3/1993 | Marsh | 248/250 |

* cited by examiner

Primary Examiner—Ramon O Ramirez
Assistant Examiner—Jon Szumny
(74) Attorney, Agent, or Firm—Myers Bigel Sibley & Sajovec

(57) ABSTRACT

A shelf support for locking a shelf edge portion in place when a shelf is positioned between opposing wall members in a cabinet or the like comprises a body member having a lower body portion, a middle body portion, and an upper body portion. The lower body portion has a front face and a back face. A shelf flange is connected to the lower body portion front face, and a stem is connected to the lower body portion back face. The middle body portion is connected to the lower body portion at a first resilient junction, with the middle body portion extending at an obtuse angle away from the lower body portion. The upper body portion is connected to the middle body portion at a second resilient junction, with the upper body portion having an inner opening formed therein, with the inner opening extending downward towards the middle body portion. The upper body portion also has a top edge portion formed thereon, with a substantially flat finger connected to the top edge portion at a third resilient junction, the finger extending downward toward the middle body portion. The finger is in a position projecting away from the upper body portion. The finger has a lower shelf retaining edge and the finger is dimensioned to be collapsibly received within the inner opening.

17 Claims, 1 Drawing Sheet

LOCKING SHELF SUPPORT

FIELD OF THE INVENTION

The present invention concerns shelf supports of the type used to support shelves between oppositely facing upright members such as cabinet side walls. The invention particularly relates to a shelf support that includes a locking mechanism to retain the shelf in place during movement of the cabinet or bookcase in which it is contained, or in case of jostling of the shelf during cleaning or manipulation of articles thereon.

BACKGROUND OF THE INVENTION

Brackets for supporting shelves inside cabinets, bookcases, and the like, while at the same time permitting the shelves to be readily adjustable, have been known for some time. However, the shipping of cabinets with internal shelves presents a problem. With shelf supports that do not also positively retain or lock the shelf in place, the jostling or shock that the article of furniture receives during shipping and handling can cause the shelf to bounce around within the cabinet and damage the cabinet. Thus, shelf supports having a retaining mechanism to maintain the shelf in position during movement have been proposed. Examples are shown in U.S. Pat. Nos. 4,666,117 to Taft; 4,432,523 to Follows; and 4,053,132 to Del Pozzo.

Even when cabinets are not shipped with shelves installed in place, it is extremely desirable to lock the shelves in place within the cabinets to prevent jostling of the shelves and the shelves from consequently falling down between the supports, and damaging the contents of any shelf positioned beneath that shelf. Thus, it is much more desirable to provide a cabinet or bookcase with an adjustable shelf that has the rigid and solid feel of a permanently installed shelf.

U.S. Pat. No. 3,471,112 to MacDonald et al. discloses a shelf support in which a resilient finger locks the shelf in place. The MacDonald device serves to reduce or prevent vertical movement of the shelf once it is installed in place. However, a problem with the MacDonald device is that no means is provided for resiliently retaining the shelf against lateral movement if the shelf is not precisely dimensioned to fit within the intended space. As will be appreciated, it is difficult to cut wood shelves to precise width dimensions so that all lateral movement of the shelf is avoided. Hence, the width of the shelves installed in a typical bookcase can vary around a median width, with some shelves being relatively long and other shelves being relatively short. Since shelves that are too wide must necessarily be trimmed to a shorter width or they will not fit into the provided space at all, the result can be shelves that rattle significantly within the cabinet of some means for cushioning lateral movement is not provided.

U.S. Pat. No. 4,037,813 to Loui et al. discloses a shelf support in which a shelf is passed over resilient members that carry a locking shoulder. The locking shoulder serves to reduce or prevent vertical movement of the shelf once it is installed in place, and the resilient members serve to tension the shelf against lateral movement. Thus, some variability of width of the shelf installed in place can be accommodated. However, this goal is frustrated in part by the need to force the shelf over the shoulder, which is formed from a solid piece that is angular in cross-section. As will be immediately apparent from FIGS. 3 and 4 of Loui, a shallower shoulder is required when a relatively long shelf is inserted, or the shelf will not be able to pass over the shoulder. However, a shallow shoulder will not effectively retain a shelf in place against jostling or the like, particularly on those occasions when a relatively short shelf is inserted in place.

Accordingly, there is a need in the art for locking shelf supports that are able to securely lock shelve in place, which can accommodate the usual variability of shelf length, and do not rely upon precise lengthwise cutting of the shelves to be installed.

SUMMARY OF THE INVENTION

In accordance with the present invention, a shelf support for locking a shelf edge portion in place when a shelf is positioned between opposing wall members in a cabinet or the like is disclosed herein. The shelf support comprises a body member having a lower body portion, a substantially flat middle body portion, and a substantially flat upper body portion. The lower body portion has a front face and a back face, with the back face being substantially planar so as to lie against the opposing upright wall member in which it is installed. A shelf flange is connected to the lower body portion front face, and a stem is connected to the lower body portion back face. The middle body portion is connected to the lower body portion at a first resilient junction, with the middle body portion extending at an obtuse angle away from the lower body portion.

The upper body portion is connected to the middle body portion at a second resilient junction, with the upper body portion having an inner opening formed therein, with the inner opening extending downward towards the middle body portion. The upper body portion also has a top edge portion formed thereon, with a substantially flat finger connected to the top edge portion at a third resilient junction, the finger extending downward toward the middle body portion. The finger is in a position projecting away from the upper body portion. The finger has a lower shelf retaining edge and is dimensioned to be collapsibly received within the inner opening.

The middle body portion and the upper body portion together form an obtuse angle at the second resilient junction and tend to flatten and increase that angle as a shelf edge portion is moved over the upper body portion towards the flange. In contrast, the finger and the upper body portion together forming an acute angle at the third resilient junction and tend to flatten and decrease that angle as a shelf edge portion is moved over the upper body portion towards the flange. As a result, when a shelf edge portion is moved over the upper body portion and contacts the flange, the finger returns to the aforesaid position projecting away from said upper body portion, the retaining edge engages the shelf end portion, and the shelf is locked in place between the retaining edge and the flange (with the retaining edge abutting the top of the shelf and the flange abutting the bottom of the shelf The foregoing and other objects and aspects of the invention are described in the drawings herein and the specification set forth below.

DETAILED DESCRIPTION OF PREFERRED EMBODIMENTS

The shelf support described herein may be employed in any type of furniture, including but not limited to book cases, cabinets (including china cabinets, curio cabinets, hutches, display cabinets, etc.) and the like. The furniture may be free-standing furniture, as well as installed, custom-made, or wall-mounted furniture such as kitchen cabinets, custom closet assemblies and wall units, etc.

The shelf support described herein may be conveniently formed as a single unitary piece or part of a suitable resilient synthetic organic polymer material such as acrylonitrile butadiene styrene (ABS) or polycarbonate. The part may be formed by any suitable process, typically by molding and preferably by injection molding.

Figure 1:
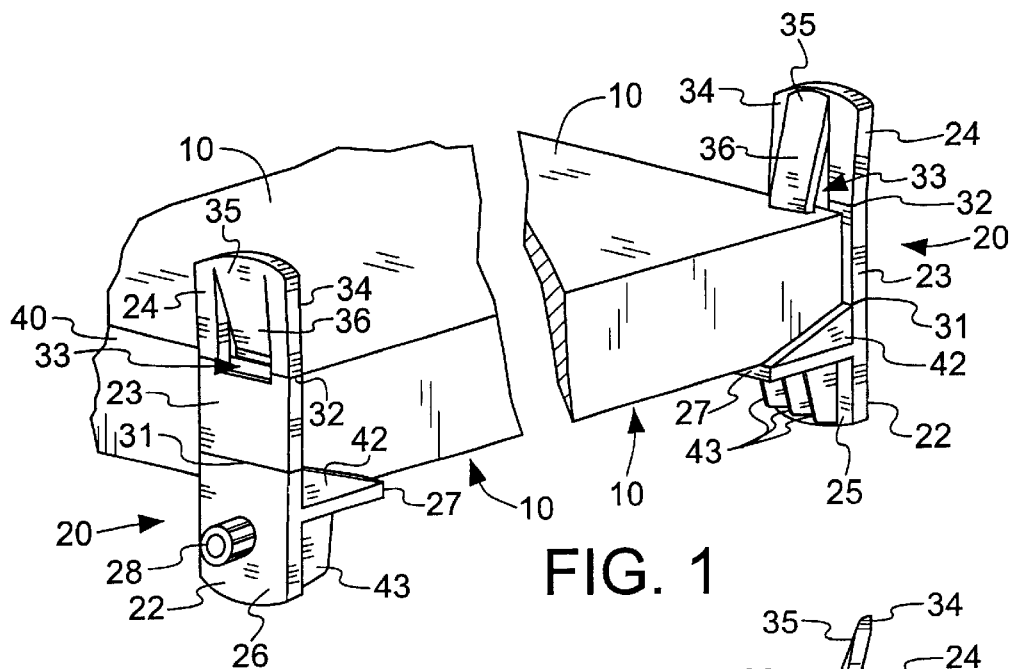
FIG. 1 is a perspective view of a cabinet or like structure that incorporates a pair of shelf supports, each shelf support constructed in accordance with the present invention.
Figure 2:
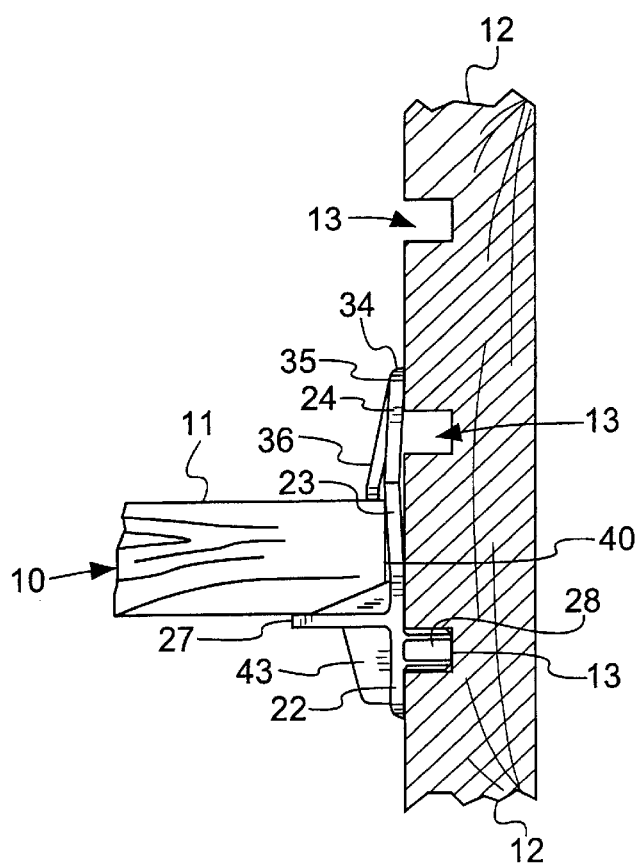
FIG. 2 is a side sectional view of an individual shelf support of the present invention installed cabinet as in FIG. 1.

FIG. 1 shows a pair of shelf supports 20, 20 of the present invention supporting a shelf 10. As shown in FIG. 2, each shelf support is positioned to support the edge portion 11 of the shelf on one wall member 12 of a pair of opposing wall members in a cabinet or the like, as described above. The wall member has at least one, and preferably a series, of holes or openings 13 formed therein to receive and hold the shelf support, as described below. In a typical embodiment, four shelf supports would be used to support a shelf, with two such supports supporting opposite ends of each shelf edge portion.

Figure 3:
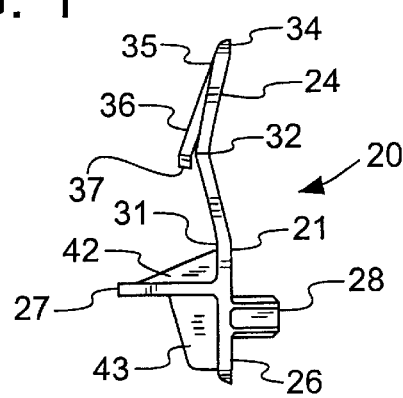
FIG. 3 is a side of a shelf support of the present invention prior to being installed in a cabinet.
Figure 4:
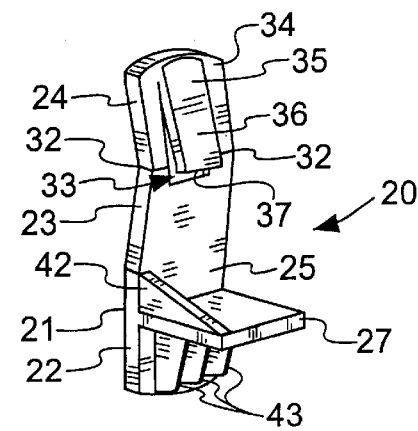
FIG. 4 is a perspective view of a shelf support of the present invention, prior to being installed in a cabinet.

The shelf support 20 is illustrated in side view in FIG. 3 and perspective view in FIG. 4. The shelf support 20 comprises a body member 21 that is substantially rectangular in shape, which body member has a lower body portion 22, a substantially flat middle body portion 23, and a substantially flat upper body portion 24. The lower body portion has a front face 25 and a back face 26, with the back face being substantially planar so as to lie against the opposing upright wall member in which it is installed. A shelf flange 27 is connected to the lower body portion front face, and a stem 28, which is generally cylindrical in shape, is connected to the lower body portion back face. The middle body portion is connected to the lower body portion at a first resilient junction 31, with the middle body portion extending at an obtuse angle away from the lower body portion.

The upper body portion is connected to the middle body portion at a second resilient junction 32, with the upper body portion having an inner opening 33 formed therein. The inner opening 33 is generally rectangular in shape, and extends downward towards the middle body portion. The upper body portion also has a top edge portion 34 formed thereon, with a substantially flat finger 36 connected to the top edge portion at a third resilient junction 35, the finger extending downward toward the middle body portion 23. As best seen in FIG. 3, the finger 36 is in a position projecting away from the upper body portion 24. The finger, which is generally rectangular in shape, has a lower shelf retaining edge 37 and the finger is dimensioned to be collapsibly received within the inner opening 33.

The middle body portion 23 and the upper body portion 24 together form an obtuse angle at the second resilient junction 32 and tend to flatten and increase that angle as a shelf edge portion 11 is moved over the upper body portion 24 towards the flange 27. In contrast, the finger 36 and the upper body portion 24 together form an acute angle at the third resilient junction 35 and tend to flatten and decrease that angle as a shelf edge portion 11 is moved over the upper body portion towards the flange 27. As a result, when a shelf edge portion is moved over the upper body portion and contacts the flange, the finger returns to the aforesaid position projecting away from said upper body portion, the retaining edge engages the shelf end portion, and the shelf is locked in place between the retaining edge and the flange (with the retaining edge abutting the top of the shelf and the flange abutting the bottom of the shelf). As shown in FIG. 2, the middle body portion 23, which has been compressed against the wall as the shelf edge portion is forced towards the flange, can then exert a compressing force against the side face 40 of the shelf edge portion and help reduce lateral movement of the shelf. However, since this compressing force is exerted primarily by action of the first and second resilient junctions 31, 32, the finger 36 is substantially free to snap back or return to its normal position, prior to being compressed by the shelf edge portion, due to the now unrestricted travel at resilient junction 35. Thus the middle body portion can act to inhibit lateral movement of the shelf without detracting from the ability of the finger to inhibit vertical movement of the shelf.

As best seen in FIG. 4, in a preferred embodiment the inner opening 33 extends beyond the second junction 32 and into the upper region of the middle body portion 23. The finger 36 also extends downward beyond the second resilient junction 32 and over an upper region of the middle body portion. Because the middle body portion is now angling away from the direction of the upper body portion in the opposite direction from which the finger is angling away from the upper body portion, it will be seen, particularly in FIG. 4, that the distance between said shelf retaining edge 37 and the body member 21 is substantially increased. This allows the shelf retaining edge to contact the shelf edge portion at a greater distance from the side face 40 and helps to reduce inadvertent slippage of the shelf passed the retaining edge (particularly when the shelf is of less than average width).

It will be seen in FIG. 1 and FIG. 3 that the flange 27 is connected to the lower body portion 22 at a position below the first resilient junction 31. This permits inclusion of a side abutment portion 42 connected to the flange and the lower body portion. The side abutment portion 42 serves to prevent forward motion of the shelf 10. It will be noted that the shelf supports in the Figures are numbered the same as if they are identical, but this is for convenience, and it will be appreciated that the two shelf supports in FIG. 1 are not identical but differ in the location of the side abutment portion, depending upon the corner of the shelf on which the support is located.

The shelf support also preferably includes at least one reinforcing gusset connected to the flange and the lower body portion to strengthen the flange and increase the load that can be carried by the flange. As illustrated, three reinforcing gussets 43, 43, 43 are most in the preferred embodiment.

While shelf supports of the present invention are intended to be used in pairs, and particularly two pairs for each shelf, it will be appreciate that a shelf support of the invention could be used on one side of a shelf and a different type of support could be used on the other side, particularly where sufficient locking is obtained with a single locking-type shelf support. It will also be appreciated the some, all, or none of the supports may include a side abutment portion, depending upon whether the cabinet has a solid back, front edge portions, or the like The foregoing is illustrative of the present invention, and is not to be construed as limiting thereof. The invention is defined by the following claims, with equivalents of the claims to be included therein.

That which is claimed is:

1. A shelf support formed from polymer material for locking a shelf edge portion in place when a shelf is positioned between opposing wall members in a cabinet or the like, said shelf support comprising:

a body member having a lower body portion, a substantially flat middle body portion, and a substantially flat upper body portion;

said lower body portion having a front face and a back face, wherein said back face is substantially planar;

a shelf flange connected to said lower body portion front face;

a stem connected to said lower body portion back face;

said middle body portion connected to said lower body portion at a first resilient junction, wherein said middle body portion extends at an obtuse angle away from said lower body portion;

said upper body portion connected to said middle body portion at a second resilient junction, said upper body portion having an inner opening formed therein and said upper body portion having a top edge portion formed thereon, with said inner opening extending downward toward said middle body portion, and a substantially flat finger connected to said top edge portion at a third resilient junction and extending downward toward said middle body portion, said finger in a position projecting away from said upper body portion, said finger having a lower shelf retaining edge, and said finger dimensioned to be collapsibly received within said inner opening;

with said middle body portion and said upper body portion together adapted to form an obtuse angle at said second resilient junction and tending to flatten and increase said angle as said shelf edge portion is moved over said upper body portion towards said flange;

and with said finger and said upper body portion together adapted to form an acute angle at said third resilient junction and tending to flatten and decrease said angle as said shelf edge portion is moved over said upper body portion towards said flange;

so that when said shelf edge portion is moved over said upper body portion and contacts said flange said finger returns to said position projecting away from said upper body portion and said retaining edge engages said shelf and locks said shelf in place against said flange.

2. The shelf support according to claim 1, wherein said inner opening extends into said middle body portion and said finger extends over a portion of said middle body portion, whereby the distance between said shelf retaining edge and said body member is increased.

3. The shelf support according to claim 1, wherein said inner opening is substantially rectangular in shape.

4. The shelf support according to claim 1, wherein said stem is substantially cylindrical in shape.

5. The shelf support according to claim 1, wherein said body member is substantially rectangular in shape.

6. The shelf support according to claim 1, wherein said flange and said body member are substantially equal in width.

7. The shelf support according to claim 1, wherein said flange is connected to said lower body portion at a position below said first resilient junction.

8. The shelf support according to claim 1, further comprising a side abutment portion connected to said flange and said lower body portion.

9. The shelf support according to claim 1, further comprising at least one reinforcing gusset connected to said flange and said lower body portion.

10. The shelf support according to claim 1 produced by the process of injection molding.

11. A shelf support formed by injection molding from a single unitary piece of polymer material for locking a shelf edge portion in place when a shelf is positioned between opposing wall members in a cabinet or the like, said shelf support comprising:

a body member having a lower body portion, a substantially flat middle body portion, and a substantially flat upper body portion;

said lower body portion having a front face and a back face, wherein said back face is substantially planar;

a shelf flange connected to said lower body portion front face;

a stem connected to said lower body portion back face;

said middle body portion connected to said lower body portion at a first resilient junction, wherein said middle body portion extends at an obtuse angle away from said lower body portion;

said upper body portion connected to said middle body portion at a second resilient junction, said upper body portion having an inner opening formed therein and said upper body portion having a top edge portion formed thereon, with said inner opening extending downward toward said middle body portion, and a substantially flat finger connected to said top edge portion at a third resilient junction and extending downward toward said middle body portion, said finger in a position projecting away from said upper body portion, said finger having a lower shelf retaining edge, and said finger dimensioned to be collapsibly received within said inner opening;

wherein said flange is connected to said lower body portion at a position below said first resilient junction;

and wherein said inner opening extends into said middle body portion and said finger extends over a portion of said middle body portion, whereby the distance between said shelf retaining edge and said body member is increased;

with said middle body portion and said upper body portion together adapted to form an obtuse angle at said second resilient junction and tending to flatten and increase said angle as said shelf edge portion is moved over said upper body portion towards said flange;

and with said finger and said upper body portion together adapted to form an acute angle at said third resilient junction and tending to flatten and decrease said angle as said shelf edge portion is moved over said upper body portion towards said flange;

so that when said shelf edge portion is moved over said upper body portion and contacts said flange said finger returns to said position projecting away from said upper body portion and said retaining edge engages said shelf and locks said shelf in place against said flange.

12. The shelf support according to claim 11, wherein said inner opening is substantially rectangular in shape.

13. The shelf support according to claim 11, wherein said stem is substantially cylindrical in shape.

14. The shelf support according to claim 11, wherein said flange and said body member are substantially equal in width.

15. The shelf support according to claim 11, further comprising a side abutment portion connected to said flange and said lower body portion.

16. The shelf support according to claim 11, further comprising at least one reinforcing gusset connected to said flange and said lower body portion.

17. The shelf support according to claim 11, wherein said body member is substantially rectangular in shape.

* * * * *